(12) United States Patent
Freeman et al.

(10) Patent No.: US 9,260,559 B2
(45) Date of Patent: Feb. 16, 2016

(54) PROCESSES FOR THE PREPARATION OF RHEOLOGY MODIFIERS

(71) Applicant: Elementis Specialties, Inc., East Windsor, NJ (US)

(72) Inventors: Stanley Leon Freeman, Plainsboro, NJ (US); Mark Gregory Matyi, Jr., Willow Grove, PA (US); Nancy Pasquarello Buford, King of Prussia, PA (US)

(73) Assignee: Elementis Specialties, Inc., East Windsor, NJ (US)

( * ) Notice: Subject to any disclaimer, the term of this patent is extended or adjusted under 35 U.S.C. 154(b) by 69 days.

(21) Appl. No.: 13/783,432

(22) Filed: Mar. 4, 2013

(65) Prior Publication Data

US 2014/0135468 A1    May 15, 2014

Related U.S. Application Data

(60) Provisional application No. 61/725,290, filed on Nov. 12, 2012.

(51) Int. Cl.
| | |
|---|---|
| *C08G 18/22* | (2006.01) |
| *C08G 18/48* | (2006.01) |
| *C08G 18/72* | (2006.01) |
| *C08G 18/10* | (2006.01) |
| *C08G 18/73* | (2006.01) |
| *C09D 5/00* | (2006.01) |
| *C08G 18/79* | (2006.01) |
| *C09D 7/00* | (2006.01) |
| *C08G 18/28* | (2006.01) |
| *C09D 175/08* | (2006.01) |

(52) U.S. Cl.
CPC .............. *C08G 18/227* (2013.01); *C08G 18/10* (2013.01); *C08G 18/2825* (2013.01); *C08G 18/4833* (2013.01); *C08G 18/4837* (2013.01); *C08G 18/72* (2013.01); *C08G 18/73* (2013.01); *C08G 18/792* (2013.01); *C09D 5/00* (2013.01); *C09D 7/002* (2013.01); *C09D 175/08* (2013.01)

(58) Field of Classification Search
CPC .......... C08G 18/4833; C08G 18/4837; C08G 18/72; C08G 18/792; C08G 18/10; C08G 18/2815; C08G 18/2865; C09F 175/08
USPC ......... 524/589, 590, 591, 839, 872, 873, 875; 528/67, 76, 85
See application file for complete search history.

(56) References Cited

U.S. PATENT DOCUMENTS

| | | | |
|---|---|---|---|
| 4,180,491 A * | 12/1979 | Kim et al. ..................... | 524/317 |
| 2012/0101223 A1 * | 4/2012 | Rabasco et al. ............... | 524/590 |

* cited by examiner

*Primary Examiner* — Michael L Leonard
(74) *Attorney, Agent, or Firm* — Morgan, Lewis & Bockius, LLP

(57) ABSTRACT

Methods for preparing hydrophobically modified alkylene oxide urethane branched polymers. In an embodiment, the order of addition of reactants affects the properties of the resultant product urethane. In an embodiment, the time at which one or more reactants are added affects the properties of the resultant product urethane.

15 Claims, No Drawings

PROCESSES FOR THE PREPARATION OF RHEOLOGY MODIFIERS

CROSS-REFERENCE TO RELATED APPLICATIONS

This application claims priority benefit under 35 U.S.C. §119 of U.S. Provisional application Ser. No. 61/725,290, filed 12 Nov. 2012, the entire subject matter of which is incorporated herein by reference.

BACKGROUND OF THE INVENTION

Rheology modifiers are used in waterborne coatings formulations to control viscosity over a wide shear rate range. They may be associative (they associate with the dispersed phase) or non-associative (they thicken the water phase). Associative thickeners may be derived from natural products such as hydrophobically modified cellulose ethers, or prepared from synthetic polymers such as hydrophobically modified ethylene oxide urethane (HEUR) polymers. A typical description of HEUR polymers and their preparation can be found in US 2009/0318595 A1, which describes forming a combination of linear and branched HEUR polymers by reacting a polyglycol, a hydrophobic alcohol, a diisocyanate, and a triisocyanate together in a one-pot reaction. U.S. Pat. No. 4,155,892 (Emmons et al.) describes the preparation of linear as well as branched HEUR polymers in separate examples.

SUMMARY OF THE INVENTION

In an embodiment, encompassed herein is a process for the preparation of a hydrophobically modified alkylene oxide urethane branched polymer, comprising contacting a polyisocyanate compound with a water-soluble polyalkylene glycol, under a first reaction condition, to form a first reaction mixture, the water-soluble polyalkylene glycol being present in a quantity that is in excess of the amount required to react with the amount of the polyisocyanate compound present in the first reaction mixture, the polyisocyanate compound comprising at least three isocyanate groups, the first reaction mixture comprising a water-soluble polyalkylene glycol and a poly-hydroxyalkylene oxide urethane, contacting the first reaction mixture with a diisocyanate compound and one or more mono-functional compounds, having an isocyanate reactive functional moiety, under a second reaction condition, to form a second reaction mixture, the second reaction mixture comprising the hydrophobically modified alkylene oxide urethane branched polymer. In an embodiment, the water-soluble polyalkylene glycol is in a quantity of from 5-10 times a molar amount required to react with a molar amount of the polyisocyanate compound present in the first reaction mixture.

In an embodiment, the first reaction condition comprises contacting the polyisocyanate compound with the water-soluble polyalkylene glycol in the presence of a solvent. In an embodiment, the solvent comprises toluene. In an embodiment, the first reaction condition comprises contacting the polyisocyanate compound with the water-soluble polyalkylene glycol in the absence of a solvent.

In an embodiment, the diisocyanate compound is in a quantity of from about 4 to about 10 times the molar amount of the polyisocyanate compound. In an embodiment, the mono-functional compound is in a quantity of from about 3 to about 9 times the molar amount of the polyisocyanate compound. In an embodiment, the diisocyanate compound and the mono-functional compound are added simultaneously to the first reaction mixture. In an embodiment, the mono-functional compound is independently selected from the group consisting of a linear, branched, or alicylic aliphatic groups having an isocyanate reactive moiety. In an embodiment, the linear or branched aliphatic alcohol are independently selected from the group consisting of: 2-ethylhexanol, 1-octanol, 1-decanol, 1-dodecanol, 1-tetradecanol, 1-hexadecanol, 2-butyloctanol, 2-hexyldecanol, di-n-octylaminoethanol, di-2-ethylhexylaminoethanol, di-hexylaminoethanol, 2-(diphenylphosphino)ethylamine, 2-(dioctylamino)-ethanol, and 2-(diethylhexylamino)-ethanol.

In an embodiment, the mono-functional compound is independently selected from the group consisting of a primary amine, a secondary amine or a tertiary amine. In an embodiment, the amines are independently selected from the group consisting of: nonylamine, hexylamine, heptylamine, octylamine, decylamine, dodecylamine, N-methyl-N-octadecylamine, N-octylethylenediamine, N-dodecylethylene-diamine, N-octylaminoethanol, N-dodecylaminoethanol, and 2-(2,2,6,6-tetramethyl-4-piperidinyl)ethanol.

In an embodiment, the hydrophobically modified alkylene oxide urethane branched polymer comprises an alkyl carbamate end-capped hydrophobically modified alkylene oxide urethane. In an embodiment, the process for the preparation of the hydrophobically modified alkylene oxide urethane branched polymer in accordance with claim 1, wherein the polyisocyanate compound is independently selected from the group consisting of HDI isocyanurate (trimer), IPDI isocyanurate (trimer), and a combination thereof. In an embodiment, the polyisocyanate compound is independently selected from the group consisting of compounds represented by Formulas 1-3 as set forth in the specification.

In an embodiment, the water-soluble polyalkylene glycol comprises PEG 8000 polyethylene glycol. In an embodiment, the water-soluble polyalkylene glycol comprises a polyethylene glycol having a number average molecular weight in the range independently selected from the group consisting of from about 4000 to about 9000 g/mole, about 6000 to about 9000 g/moles, and from about 7000 to about 9000 g/mole.

In an embodiment, encompassed herein is a process for the preparation of a hydrophobically modified alkylene oxide urethane branched polymer, comprising contacting a diisocyanate compound with a water-soluble polyalkylene glycol, a polyisocyanate compound, and a first amount of one or more mono-functional compounds having an isocyanate reactive functional moiety, under a first reaction condition, to form a first reaction mixture containing an alkylene oxide urethane polymer having unreacted isocyanate end groups, wherein a total amount of isocyanate groups, associated with the diisocyanate compound and the polyisocyanate compound, being in a quantity that is in excess of the amount required to react with the amount of water-soluble polyalkylene glycol, and wherein the one or more mono-functional compounds being in a quantity that is less than the amount to react with an amount of unreacted isocyanate groups, and contacting the first reaction mixture with a second amount one or more mono-functional compounds, having an isocyanate reactive functional moiety, under a second reaction condition, the second amount of the one or more mono-functional compounds being in a quantity that is less than or greater than the amount required to react with an amount of the unreacted isocyanate end groups of the alkylene oxide urethane polymer in the first reaction mixture.

In an embodiment, the isocyante is independently selected from the group consisting of hexamethylene diisocyanate ("HDI"), trimethyl hexamethylene diisocyanate ("TMDI"), isophorone diisocyanate ("IPDI"), tetramethyl xylylene diisocyanate ("TMXDI"), 4,4'-methylene bis(cyclohexylisocyanate) ("DESDOMUR® W"), and combinations thereof. In an embodiment, the mono-functional compound is independently selected from the group consisting of a linear, branched, or alicylic aliphatic groups having an isocyanate reactive moiety. In an embodiment, the linear or branched aliphatic alcohol are independently selected from the group consisting of: 2-ethylhexanol, 1-octanol, 1-decanol, 1-dodecanol, 1-tetradecanol, 1-hexadecanol, 2-butyloctanol, 2-hexyldecanol, di-n-octylaminoethanol, di-2-ethylhexylaminoethanol, di-hexylaminoethanol, 2-(diphenylphosphino)ethylamine, 2-(dioctylamino)-ethanol, and 2-(diethylhexylamino)-ethanol.

In an embodiment, the mono-functional compound is independently selected from the group consisting of: a primary amine, a secondary amine or a tertiary amine. In an embodiment, the amines are independently selected from the group consisting of: nonylamine, hexylamine, heptylamine, octylamine, decylamine, dodecylamine, N-methyl-N-octadecylamine, N-octylethylenediamine, N-dodecylethylene-diamine, N-octylaminoethanol, N-dodecylaminoethanol, and 2-(2,2,6,6-tetramethyl-4-piperidinyl)ethanol.

In an embodiment, the hydrophobically modified alkylene oxide urethane branched polymer comprises an alkyl carbamate end-capped hydrophobically modified alkylene oxide urethane.

In an embodiment, the polyisocyanate is independently selected from the group consisting of HDI isocyanurate (trimer), IPDI isocyanurate (trimer), and a combination thereof In an embodiment, the polyisocyanate is independently selected from the group consisting of compounds represented by Formulas 1-3 as set forth in the specification.

In an embodiment, the water-soluble polyalkylene glycol comprises PEG 8000 polyethylene glycol. In an embodiment, the water-soluble polyalkylene glycol comprises a polyethylene glycol having a number average molecular weight in the range independently selected from the group consisting of from about 4000 to about 9000 g/mole, about 6000 to about 9000 g/moles, and from about 7000 to about 9000 g/mole.

DETAILED DESCRIPTION OF THE EMBODIMENTS

The present disclosure relates to hydrophobically modified alkylene oxide urethane branched polymers, which are used, in one example, as rheology modifiers in waterborne coatings formulations. In various embodiments, the present disclosure encompassed herein provides for methods of preparation of such polymers.

It has surprisingly been discovered that the methods described herein for preparing hydrophobically modified alkylene oxide urethane branched polymers provide polymers with superior rheological properties as compared to similar and/or identical polymers prepared using prior art methods. While not wishing to be bound by any particular theory, in an embodiment, polymers made according to the methods and compositions disclosed herein can be used to prepare paints having a more desirable and/or a more useful sag-leveling balance. Further while not wishing to be bound to any particular theory, the more desirable and/or more useful sag-leveling balance may be due to different morphology of the polymers according to the methods and compositions disclosed herein, compared to prior art compositions.

Methods of Preparing Hydrophobically Modified Alkylene Oxide Urethane Branched Polymers In an embodiment, the present disclosure encompasses a method comprising: (a) contacting a polyisocyanate compound with an excess of a water-soluble polyalkylene glycol under a first reaction condition to form a first mixture comprising the polyalkylene glycol and the poly-hydroxyalkylene oxide urethane; (b) followed by contacting the first mixture with a second mixture comprising a diisocyanate compound and one or more mono-functional compounds, having functional moieties that are isocyanate reactive, under second reactions conditions, to form a hydrophobically modified alkylene oxide urethane polymer. In one such embodiment, the first reaction condition comprises contacting the polyisocyanate with the water-soluble polyalkylene glycol for a period of at least one hour. In another such embodiment, the second reaction condition comprises contacting the diisocyanate and the mono-functional compound with the first mixture comprising the water-soluble polyalkylene glycol and the poly-hydroxyalkylene oxide urethane for a period of at least one hour.

Alternatively, in an embodiment, the present disclosure encompasses a method comprising: (a) contacting a water-soluble polyalkylene glycol with an excess of diisocyanate compound under such conditions to form a first mixture; (b) contacting the first mixture with one or more mono-functional compounds, having functional moieties that are isocyanate reactive, under conditions to form a second mixture; and (c) contacting the second mixture with a third mixture comprising a polyisocyanate compound to form a hydrophobically modified alkylene oxide urethane polymer.

In yet another embodiment, the present disclosure encompasses a method comprising: (a) contacting a diisocyanate with a water-soluble polyalkylene glycol and one or more first mono-functional compounds, having an isocyanate reactive functional moiety, under a first reaction condition, to form a first reaction mixture, the first mono-functional compound being in a first amount that is less than the amount required to exhaustively react with an amount of a poly-hydroxyalkylene oxide urethane formed in the first reaction mixture, and the water-soluble polyalkylene glycol being in a quantity that is greater that the amount required to react with the amount of the diisocyanate present in the first reaction mixture, (b) contacting the first reaction mixture with a polyisocyanate, under a second reaction condition, to form a second reaction mixture, the polyisocyanate comprising at least three isocyanate groups; and (c) contacting the second reaction mixture with a second amount of one or more second mono-functional compound, having an isocyanate reactive functional moiety, under a third reaction condition, to form a third reaction mixture, the second mono-functional compound being the same as or different than the first mono-functional compound, the third reaction mixture comprising the hydrophobically modified alkylene oxide urethane branched polymer. In some embodiments, the first amount of the one or more mono-functional compounds is different than the second amount of the one or more mono-functional compounds. In some embodiments, the first amount of the one or more mono-functional compounds is the same as the second amount of the one or more mono-functional compounds. In some embodiments, the first amount of the one or more mono-functional compounds is less than an amount of diisocyanate. In some embodiments, the first mono-functional compound and the second mono-functional compound are the same compound. In some embodiments, the first mono-functional compound and the second mono-functional compound are different compounds.

In another embodiment, the present disclosure encompasses a method comprising: contacting a diisocyanate compound with a water-soluble polyalkylene glycol, a polyisocyanate compound, and a first amount of one or more mono-functional compounds having an isocyanate reactive functional moiety, under a first reaction condition, to form a first reaction mixture containing an alkylene oxide urethane polymer having unreacted isocyanate end groups, wherein a total amount of isocyanate groups, associated with the diisocyanate compound and the polyisocyanate compound, being in a quantity that is in excess of the amount required to react with the amount of water-soluble polyalkylene glycol, and wherein the one or more mono-functional compounds being in a quantity that is less than the amount to react with an amount of unreacted isocyanate groups; and contacting the first reaction mixture with a second amount one or more mono-functional compounds, having an isocyanate reactive functional moiety, under a second reaction condition, the second amount of the one or more mono-functional compounds being in a quantity that is less than or greater than the amount required to react with an amount of the unreacted isocyanate end groups of the alkylene oxide urethane polymer in the first reaction mixture. In some embodiments, the first mono-functional compound and the second mono-functional compound are the same compound. In some embodiments, the first mono-functional compound and the second mono-functional compound are different compounds. For the purposes of this application, greater than or less than corresponds to ±20%.

In some embodiments, the reactant ratio of polyisocyanate compound: water-soluble polyalkylene glycol: diisocyanate compound: mono-functional compound corresponds to 1:(5-10):(4-10):(3-9). In some embodiments, the reactant ratio of polyisocyanate compound: water-soluble polyalkylene glycol: diisocyanate compound: mono-functional compound corresponds to 1:(6-8):(6-10):(5-9). In some embodiments, the reactant ratio of polyisocyanate compound: water-soluble polyalkylene glycol: diisocyanate compound: mono-functional compound corresponds to 1:6.4:8.4:7.

In some embodiments, the water-soluble polyalkylene glycol is in a quantity of from 5-10 times a molar amount required to react with a molar amount of the polyisocyanate present in the first reaction mixture. In other embodiments, the water-soluble polyalkylene glycol is in a quantity of from 4-8 times a molar amount required to react with a molar amount of the polyisocyanate present in the first reaction mixture. In still other embodiments, the water-soluble polyalkylene glycol is in a quantity of from 6-8 times a molar amount required to react with a molar amount of the polyisocyanate present in the first reaction mixture.

In some embodiments, the diisocyanate compound is in a quantity of from about 4 to about 10 times the molar amount of the polyisocyanate compound. In some embodiments, the diisocyanate compound is in a quantity of from about 6 to about 10 times the molar amount of the polyisocyanate compound.

In some embodiments, the mono-functional compound is in a quantity of from about 3 to about 9 times the molar amount of the polyisocyanate. In some embodiments, the mono-functional compound is in a quantity of from about 5 to about 9 times the molar amount of the polyisocyanate.

In an embodiment, the reaction is carried out under conditions designed to ensure complete or substantially complete consumption of the isocyanate groups. In such an embodiment, a mono-functional compound having functional moieties that are isocyanate reactive is used at a mole ratio of mono-functional compound to isocyanate group ranges from 0.85:1 to 0.95:1.

In some embodiments wherein the one or more mono-function compounds are added in a first amount and a second amount, the ratio of the first amount of mono-functional compound to the polyisocyanate compound ranges from 0.5:1 to 3:1 and the second amount of mono-functional compound to the polyisocyanate compound ranges from 6.5:1 to 3:1. In some embodiments wherein the one or more mono-function compounds are added in a first amount and a second amount, the ratio of the first amount of mono-functional compound to the polyisocyanate compound ranges from 1:1 to 3:1 and the second amount of mono-functional compound to the polyisocyanate compound ranges from 6:1 to 3:1.

In some embodiments wherein the one or more mono-function compounds are added in a first amount and a second amount, the ratio of the first amount of mono-functional compound to the polyisocyanate compound corresponds to 1:1 and the ratio of the second amount of mono-functional compound to the polyisocyanate compound corresponds to 6:1. In some embodiments wherein the one or more mono-function compounds are added in a first amount and a second amount, the ratio of the first amount of mono-functional compound to the polyisocyanate compound corresponds to 2:1 and the ratio of the second amount of mono-functional compound to the polyisocyanate compound corresponds to 5:1. In some embodiments wherein the one or more mono-function compounds are added in a first amount and a second amount, the ratio of the first amount of mono-functional compound to the polyisocyanate compound corresponds to 3.5:1 and the ratio of the second amount of mono-functional compound to the polyisocyanate compound corresponds to 3.5:1.

In an embodiment, the water-soluble polyalkylene glycol is advantageously contacted with the polyisocyanate compound in the presence of a catalyst designed to promote the coupling of the hydroxyl and isocyanate groups. Non-limiting examples of suitable catalysts include tin catalysts, such as dibutyltin dilaurate and dibutyltin diacetate, bismuth catalysts, and tertiary amines.

In an embodiment, the polyisocyanate compound is added to a pre-dried mixture of the polyalkylene glycol. In an embodiment, the polyisocyanate compound is added to a pre-dried mixture of the polyalkylene glycol and optionally a non-interfering solvent with a relatively high boiling point such as toluene. In an embodiment, the polyisocyanate compound is added to a pre-dried mixture of the polyalkylene glycol and the overall reaction is performed in the absence of solvent.

In an embodiment, the diisocyanate compound is added to a pre-dried mixture of the polyalkylene glycol. In an embodiment, the diisocyanate compound is added to a pre-dried mixture of the polyalkylene glycol and optionally a non-interfering solvent with a relatively high boiling point such as toluene. In an embodiment, the diisocyanate compound is added to a pre-dried mixture of the polyalkylene glycol and the overall reaction is performed in the absence of solvent.

In an embodiment, each of the reaction steps is conducted at a temperature in the range of 80° C. to 120° C., and over a period of about 1 hour to about 3 hours. In an embodiment, each of the reaction steps is conducted over a period of about 0.5 hours to about 5 hours. In an embodiment, a reaction step is conducted over a period of about 45 minutes. In an embodiment, a reaction step comprising a second or further addition of one or more mono-functional compounds having functional moieties that are isocyanate reactive is conducted over a period of about 45 minutes.

Reactants

In the various embodiments described herein, the reactants include water-soluble polyakylene glycol compounds, polyisocyanate compounds, diisocyanates and mono-functional compounds having functional moieties which are isocyanate reactive.

In an embodiment, a water-soluble polyalkylene glycol refers to a polyethylene oxide polymer or a polyethylene oxide-polypropylene oxide copolymer, hereinafter designated polyoxyalkylene chains or polyoxyalkylene polymers where the term "oxyalkylene" refers to units having the structure —(O-A)-, with O-A represents the monomeric residue of the polymerization reaction product of $C_2$-$_8$ alkylene oxides or diols. Examples of oxyalkylenes include, but are not limited to: oxyethylene with the structure —(OCH$_2$CH$_2$); oxypropylene with the structure —(OCH(CH$_3$)CH$_2$— or —(OCH$_2$(CH—)CH$_3$; oxytrimethylene with the structure —(OCH$_2$CH$_2$CH$_2$)—; and 1,4-oxybutylene with the general structure —(OC$_4$H$_8$)—. Polymers containing these units are referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxybutylene include a homopolymer containing units of 1,2-oxybutylene, —(OCH(C$_2$H$_5$)CH$_2$)—; and polytetrahydrofuran, a homopolymer containing units of 1,4-oxybutylene, or —(OCH$_2$CH$_2$CH$_2$CH$_2$)—. The polyoxyalkylene compounds, independent of monomer composition, may be water soluble.

In other embodiments, the polyoxyalkylene chains have a nominal number average molecular weight ranging from 4,000-9,000 g/mole. In another embodiment, the polyoxyalkylene chains have a number average molecular weight of up to about 6,000-9,000 g/mole. In another embodiment, the polyoxyalkylene chains have a number average molecular weight of up to about 7,000-9,000 g/mole. In certain embodiments, the polyoxyalkylene polymer may have from about 155 to about 225 ethylene oxide repeat units. In some embodiments, the polyoxyalkylene may have 135 to about 205 ethylene oxide repeat units.

In other embodiments, the polyoxyalkylene units can be copolymeric, containing two or more different oxyalkylene segments. The different oxyalkylene groups can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene segments, and each polymer block contains at least two of the same oxyalkylene segments. In one such embodiment, an oxyalkylene group is oxyethylene.

In an embodiment, "polyisocyanate compound" refers to a compound comprising at least three isocyanate groups. Non-limiting examples of polyisocyanate compounds include cyanurate trimers and biuret trimers, which are characterized by the following formulas:

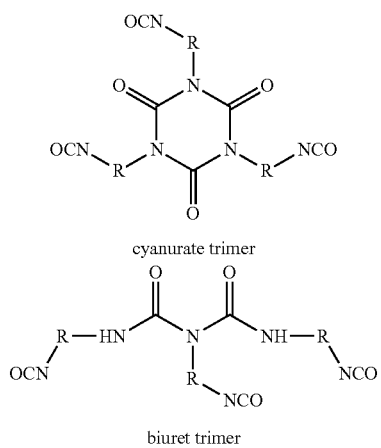

cyanurate trimer biuret trimer where R is a $C_4$-$C_{30}$-alkylene group, more particularly a $C_4$-$C_{20}$-alkylene group. As used herein, the term "alkylene group" refers to a biradical saturated or partially saturated hydrocarbyl group that is linear-, branched-, or cycloaliphatic or a combination thereof. Non-limiting examples of suitable cyanurate trimers include HDI isocyanurate (trimer), and IPDI isocyanurate (trimer). The structures of these cyanurate compounds are illustrated:

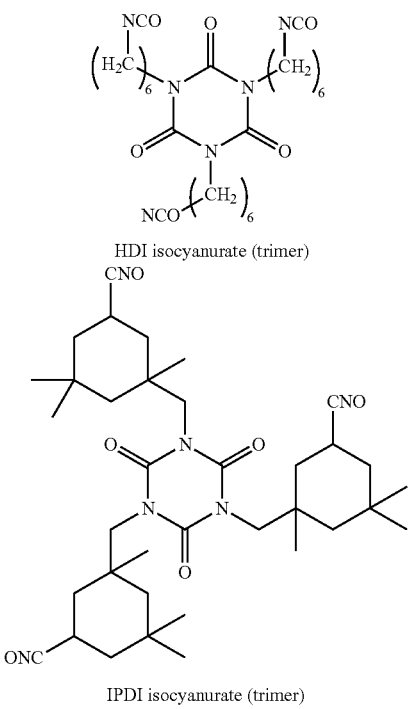

HDI isocyanurate (trimer)

IPDI isocyanurate (trimer)

In an embodiment, diisocyanates may be aliphatic or aromatic diisocyanates, or combinations thereof. As used herein, "aliphatic" refers to saturated or partially unsaturated linear-, branched-, or cycloaliphatic, or combinations thereof Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate. Preferred diisocyanates include hexamethylene diisocyanate and isophorone diisocyanate.

Epihalohydrins include epichlorohydrin and epibromohydrin; gem-dihalides include gem-dichlorides and gem-dibromides such as dichloromethane, dibromomethane, 1,1-dichloroethane, 1,1-dibromoethane, 1,1-dichlorotoluene, and 1,1-dibromotoluene.

In an embodiment, a difunctional linking agent is conveniently added to the composition containing the branched poly-hydroxyalkylene oxide urethane/polyalkylene glycol mixture at sufficient quantities and under conditions to ensure complete or substantially complete conversion of the hydroxyl groups to urethane groups. Thus, in an embodiment, a stoichiometric excess of the difunctional linking agent is conveniently used in this step.

In an embodiment, the one or more mono-functional compounds may include linear, branched, or alicylic aliphatic groups having an isocyanate reactive moiety such as a hydroxyl group. In another embodiment, the mono-functional compounds may include linear aliphatic groups having an isocyanate reactive moiety such as a hydroxyl group. In another such embodiment, the mono-functional compound includes a linear, branched, or alicylic aliphatic alcohol having 6 to 16 carbon atoms. In yet another such embodiment, the mono-functional compound includes a linear aliphatic alcohol having 6 to 16 carbon atoms. In one embodiment, the linear or branched aliphatic alcohol includes 2-ethylhexanol, 1-octanol, 1-decanol, 1-dodecanol, 1-tetradecanol, 1-hexadecanol, 2-butyloctanol and 2-hexyldecanol. In another embodiment the aliphatic alcohol is selected from the group consisting of di-n-octylaminoethanol, di-2-ethylhexylaminoethanol, di-hexylaminoethanol, 2-(diphenylphosphino)ethylamine, 2-(dioctylamino)-ethanol, and 2-(diethylhexylamino)-ethanol. In another embodiment, the mono-functional compound is a primary amine, a secondary amine or a tertiary amine. Examples include Nonylamine, hexylamine, heptylamine, octylamine, decylamine, dodecylamine, and N-methyl-N-octadecylamine. Examples of reagents that can be used to generate hydrophobic groups comprising at least one secondary amine functionality include N-octylethylenediamine, N-dodecylethylene-diamine, N-octylaminoethanol, N-dodecylaminoethanol, and 2-(2,2,6,6-tetramethyl-4-piperidinyl)ethanol. Alternative routes to generate hydrophobic groups comprising at least one secondary amine functionality include the reaction of primary amines, such as octylamine, decylamine, and isotridecylamine, with an alkylhalide, epoxide, or aminoplast reagent. These reagents would be used to provide hydrophobic groups on the ends of polymer chains. Further examples of reagents that can be used to generate hydrophobic groups comprising at least one tertiary amine functionality include the corresponding amine oxides of the above, for example, 2-(dibutylamino)ethanol N-oxide, 2-(dioctylamino)ethanol N-oxide, and N-benzyl 3-hydroxypiperidine N-oxide.

In some embodiments, the mono-functional compound may include 1-decanol, 2-(n-butyl)-1-octanol, 2-ethylhexanol, 1-nonanol, 1-dodecanol and mixtures thereof. In one embodiment, the terminal hydrophobic unit contains at least two aliphatic di-radical segments connected by functional groups and at least one end is terminated by a terminal mono-functional segment capable of undergoing a condensation reaction. In one embodiment, the terminal mono-functional segment is end terminated by a hydroxyl group, an amine group, ester group, an isocyanate group or mixtures thereof.

In one such embodiment, the terminal mono-functional segment is end terminated by a hydroxyl group. In one such embodiment, the mono-terminal functional segment is end terminated by an isocyanate group. In one such embodiment, the terminal hydrophobic unit contains from 12 to 29 carbon atoms (exclusive of the linking group carbon atoms, e.g., carbonyl carbons). In one embodiment, the terminal hydrophobic unit may have two hydrophobic segments linked by a functional group independently selected from an amido functional group (—R—C(=O)—NH), urethane functional group (O—R—C(=O)—NH), urea functional group (NR—C(=O)—NH) or mixtures thereof. In one such embodiment, the linking group is a urethane group.

In another embodiment, each mono-functional compound has at least 17 contiguous carbon atoms. Examples include octadecyl isocyanate, stearic acid, octadecylamine, octadecanol and 1,2-epoxyoctadecane.

In an embodiment, after preparing polymers according to the methods disclosed herein, volatile compounds may be removed by convenient means such as rotary evaporation and the desired polymer is isolated.

Aqueous Thickening Composition

In one embodiment, the present disclosure further provides for an aqueous thickening composition containing a hydrophobically modified alkylene oxide urethane branched polymer, having various embodiments as described herein, and water. In some embodiments, the aqueous thickening composition may contain 10-35 wt. % of the hydrophobically modified alkylene oxide urethane branched polymer and 65-90 wt. % of water. In some embodiments, the aqueous thickening composition may contain 20-25 wt. % of the hydrophobically modified alkylene oxide urethane branched polymer and 75-80 wt. % of water.

In one embodiment, the present disclosure further provides for an aqueous thickening composition containing a hydrophobically modified alkylene oxide urethane branched polymer, according to various embodiments as described herein, a viscosity suppressant and water. In some embodiments, the viscosity suppressant is an organic solvent such as butoxyethanol, diethylene glycol monobutyl ether, triethylene glycol monobutyl ether, propylene glycol, and other water miscible organic solvents. In other embodiments, the viscosity suppressant is an inorganic salt such as sodium chloride. In still other embodiments, the viscosity suppressant is a nonionic or anionic surfactant. In some embodiments, the aqueous thickening composition may have a viscosity of up to: 2500 cP; 5000 cP; 10,000 cP; 15,000 cP; 20,000 cP; or 25,000 cP. In one such embodiment, the composition may have a viscosity ranging from: 10 to 2500 cP; 10 to 5000 cP; 10 to 10000 cP; 10 to 15,000 cP; 10 to 20,000 cP.; or 10 to 25,000 cP. Brookfield viscosities of such compositions are measured at 25° C. and 10 RPM using a Brookfield RV or RVT. Typically a #1 spindle is used for materials having a Brookfield viscosity of 400-600 cP (40-60 dial reading), a #2 spindle is used for materials having a Brookfield viscosity of 1600-2400 cP and a #3 spindle is used for materials having a Brookfield viscosity of 4000-6000 cP. The following table may also be used to determine the appropriate spindle to use when measuring Brookfield viscosity at 25° C. and 10 RPM:

| Spindle | Factor | Viscosity (cP) | |
| --- | --- | --- | --- |
| | | Mid-dial | Max |
| 1 | 10 | 500 | 1000 |
| 2 | 40 | 2000 | 4000 |
| 3 | 100 | 5000 | 10000 |

|         |        | Viscosity (cP) | |
| Spindle | Factor | Mid-dial | Max |
| --- | --- | --- | --- |
| 4 | 200 | 10000 | 20000 |
| 5 | 400 | 20000 | 40000 |
| 6 | 1000 | 50000 | 100000 |
| 7 | 4000 | 200000 | 400000 |

In some embodiments, the aqueous thickening composition may contain 15-30 wt. % of the hydrophobically modified alkylene oxide urethane branched polymer, 0.1-25 wt. % of a viscosity suppressant; and at least 45 wt. % of water. In some embodiments, the aqueous thickening composition may contain 15-30 wt. % of the hydrophobically modified alkylene oxide urethane branched polymer, 5-25 wt. % of a viscosity suppressant; and at least 45 wt. % of water. In one embodiment, each nonionic surfactant and anionic surfactant includes one or more hydrophobic group(s) and hydrophilic group(s), each of said hydrophobic group(s) having from: 6 carbon atoms to 10 carbon atoms; or 6 carbon atoms to 8 carbon atoms. In one embodiment, the anionic surfactant includes $M^+$(2-ethylhexyl sulfate); $M^+$(hexylsulfate$^-$); $M^+$(octylsulfate$^-$) and $M^+$(dioctyl sulfosuccinate$^-$), and mixtures thereof, where $M^+$ includes $NH_4^+$, $Na^+$ and $K^+$. In another embodiment, the anionic surfactant includes sodium 2-ethylhexyl sulfate; sodium hexylsulfate; sodium octylsulfate, sodium dioctyl sulfosuccinate; ammonium 2-ethylhexyl sulfate; ammonium hexylsulfate; ammonium octylsulfate, ammonium dioctyl sulfosuccinate and mixtures thereof. In another embodiment, the anionic surfactant includes sodium 2-ethylhexyl sulfate; sodium octylsulfate, sodium dioctyl sulfosuccinate and mixtures thereof. In another embodiment, the nonionic surfactant is 2-ethylhexyl ethoxylate having 2-5 moles ethylene oxide.

Paint Formulations

A variety of paint formulations may be formulated using the hydrophobically modified alkylene oxide urethane branched polymers and/or an aqueous thickening compositions, as described herein. In one embodiment, a paint formulation includes: 10-40 wt. % solids of a resin system; 0.0-2.0 wt. % actives of an associative thickener; 0.1-2.0 wt. % actives of a viscosity regulating composition according to the various embodiments discussed herein; and optionally 7-12 wt. % of a colorant composition.

A paint formulation of some embodiments of the present invention may include one or more resin film forming binders. A binder, or resin, is the actual film forming component of paint. It is an essential component of a base paint; and other components listed herein are included optionally, depending on the desired properties of the cured film. Binders can be categorized according to drying, or curing mechanism. The four most common are simple solvent evaporation, oxidative crosslinking, catalyzed polymerization, and coalescence.

In some embodiments, the resin binder is a water dispersible resin, such as a water dispersible alkyd or water dispersible polyurethane. In some embodiments, the resin binder is a water soluble resin. In certain embodiments, the resin binder is an emulsion resin, such as is typically used to manufacture latex paints. In certain embodiments, the resin includes a hydrophobic resin. Representative hydrophobic emulsion resins may include (meth)acrylic resin, a styrene acrylic resin, a styrene resin or other ethylenically unsaturated monomers. Representative examples of hydrophilic emulsion resins may include a vinyl acrylic resin or a vinyl acetate ethylene resin. In certain embodiments, the resin may have a substantially spherical shape and a large particle size or low surface area. In one embodiment, the particle size may be greater than about 200 nm. In a further embodiment, the particle size ranges from about 220 nm to about 650 nm. In certain embodiments, the resin may have a substantially spherical shape and small particle size or high surface area. In one embodiment, the particle size may be less than about 200 nm. In a further embodiment, the particle size ranges from about 80 nm to about 180 nm. In certain embodiments, the resin may have a multilobe shape. Representative resins may include Optive 130 (BASF, acrylic, 160 nm), UCAR 300 (Dow, vinyl acrylic, 260 nm), UCAR 625 (Dow, acrylic, 340 nm), Rhoplex ML-200 (Rohm & Haas, acrylic, 590 nm multilobe), and Neocryl XK-90 (DSM Neoresins, acrylic, 90 nm). In certain embodiments, combinations of resins are used to prepare the base paint.

The paint formulation may also include at least one associative thickener. Associative thickeners are water soluble, water dispersible, or water swellable polymers that have chemically attached hydrophobic groups. In certain embodiments, a paint formulation includes a condensation polymer associative thickener including but not limited to polyether polyurethanes, polyether polyols, polyether polyacetals, polyether aminoplasts and the like. In some embodiments, a paint formulation includes about 0.05 wt % to about 5 wt % as active polymer of a condensation polymer associative thickener, about 0.1 wt % to about 3 wt % as active polymer of a condensation polymer associative thickener, or about 0.2 wt % to about 1 wt % as active polymer of a condensation polymer associative thickener.

In other embodiments, the associative thickeners include nonionic hydrophobically modified materials including nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth)acrylic acids, hydrophobically-modified hydroxyethyl cellulose, and hydrophobically-modified poly(acrylamide), and mixtures thereof The number average molecular weights of the associative thickeners may range from about 10,000 to about 500,000 g/mole or more, depending on the chemical type of associative thickener. In some embodiments, the number average molecular weight of the associate thickeners may range from about 10,000 to about 50,000 g/mole. In some embodiments, the number average molecular weight of the associate thickeners may range from about 100,000 to about 300,000 g/mole. In some embodiments, the number average molecular weight of the associate thickeners may range from about 400,000 to about 500,000 g/mole or more.

In another embodiment, the associative thickener may include an ICI associative thickener which is used to increase the high shear viscosity of a composition.

A colorant containing paint formulation of the present invention may also include any suitable colorant. In some embodiments, a predispersed colorant may be added to a paint formulation. It is to be understood that this invention is equally effective with single colorants or mixtures of colorants.

Within the context of this invention, a colorant or colorant compound may include one or more colored pigment(s) which have been dispersed in an aqueous or water-miscible medium external to the paint in which it is intended to be used by use of mechanical energy, i.e., grinding or shearing by means of dispersing equipment such as, for example, a ball mill and a sand mill and then dispersed into a base paint. For the purposes of this disclosure, colorant does not include pigments in a dry undispersed state. The dispersion process is typically be achieved by the use of auxiliary compounds such as, for example, surfactants, wetting agents, water-miscible solvents, and dispersants, in addition to mechanical energy. The aqueous or water-miscible medium may also include glycols such as ethylene glycol and propylene glycol, and alcohols such as isopropanol. Dispersants may include polyethylene oxide polymers, polyethylene oxide glycols and others. The aqueous or water-miscible medium may also include extenders such as talc and calcium carbonate; humectants; thickeners; defoamer; and biocides. Such colorants are frequently added to a base paint or tint base at the point-of-sale to produce custom colors.

Pigments which are commonly used to prepare colorants include one or more inorganic or organic pigments, or metal effect agents, or combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toluidine red), quinacridone magenta, quinacridone violet, DNA orange, and organic yellow pigment (such as Hansa yellow) and combinations thereof.

The colorants are usually sold in concentrated form (typically 25% to 75% solids by weight) so that modest amounts can be used in a waterborne coating composition to provide a desired range of color intensities while not compromising the properties of the waterborne coating composition unduly. Typical amounts of colorants which are used in architectural coatings are from 2 to 4 fluid ounces of colorant per gallon of base paint for light tint bases and pastels, from 4 to 8 fluid ounces of colorant per gallon of base paint for medium tint bases, and from 6 to 16 fluid ounces of colorant per gallon of base paint for deep tone tint bases. Of course, different colorants and mixtures thereof are frequently used to provide wide latitude in color selection. Such colorants are frequently added to a base paint at the point-of-purchase of the colored paint, such as a paint store, followed by admixing the colorant and the waterborne coating composition by various means such as shaking the can of paint.

A paint system of some embodiments of the present invention may include additional components as suitable to achieve the desire effect, including but not limited to wetting agents, fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

Paint formulations may be characterized by a variety of properties including Stormer (KU) viscosity, ICI viscosity, sag and leveling.

Stormer viscosity relates to the in-can appearance and is typically measured in Krebs units (KU) using a Stormer viscometer. Mid-shear or Stormer viscosity was measured by the test method described in ASTM D562-01 "Standard Test Method Consistency of Paints Measuring Krebs Unit (KU) Viscosity Using a Stormer-Type Viscometer."

ICI viscosity represents the viscosity of the paint during typical brush and roller application conditions. It is typically measured at 10,000 $sec^{-1}$ by the test method described in ASTM D4287-00 "Standard Test Method for High-Shear Viscosity Using a Cone/Plate Viscometer."

The sag and leveling properties of a film, on a substrate, formed by application of a paint formulation, containing the mid-shear regulating composition, were also measured. Sag values were measured following the test method described in ASTM D4400-99 (Reapproved 2007) "Standard Test Method for Sag Resistance of Paints Using a Multinotch Applicator." The leveling values were measured following the test method described in ASTM D4062-99 (Reapproved 2003) "Standard Test Method for Leveling of Paints by Draw-Down Method."

By way of a non-limiting example, the compounds encompassed herein are used to make high-shear (e.g., ICI) rheological modifiers.

For the purposes of this disclosure, the term "about" means plus or minus 10%.

EXPERIMENTAL EXAMLPES

The following examples further describe and demonstrate illustrative embodiments within the scope of the present invention. The examples are given solely for illustration and are not to be construed as limitations of this invention as many variations are possible without departing from the spirit and scope thereof.

Experimental: Processes for making a hydrophobically modified alkylene oxide urethane branched polymers.

Hydrophobically modified alkylene oxide urethane branched polymers of the present disclosure, made as set forth in detail herein, were tested as rheology-modifying agents in paint samples and compared to hydrophobically modified alkylene oxide urethane polymers prepared according to prior art methods. Table 2 illustrates the improved effect of various hydrophobically modified alkylene oxide urethane branched polymers of the present disclosure on the appearance of "sag" and "leveling" in paints prepared using the rheology modifiers of the present disclosure. These two art-accepted indicators of rheological properties of paint are both improved in paints containing hydrophobically modified alkylene oxide urethane branched polymers of the present disclosure.

Comparative Example 1

A viscosity regulating composition was prepared as follows: To a 500 ml reaction kettle equipped with a nitrogen inlet, stirrer, Dean Stark trap and a condenser, 56.3 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.69 g of Desmodur N3600 and 1.68 g hexamethylene diisocyanate. The mixture was stirred for 2 minutes and 0.10 g of K-Kat 348 was added. The reaction is stirred at 90° C. for 3 hours. To this mixture 1.32 g of 1-decanol was added. The reaction mixture was stirred at 90° C. for 1 hour. The mixture was cooled and poured onto a plastic tray to evaporate toluene. The polymer was further dried in a vacuum oven.

Comparative Example 2.

To a 500 ml reaction kettle equipped with a nitrogen inlet, stirrer, Dean Stark trap and a condenser, 56.3 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.69 g of Desmodur N3600. The mixture was stirred for 2 minutes and 0.10g of K-Kat 348 was added. The reaction is stirred at 90° C. for 3 hours. To this mixture, 1.68 g hexamethylene diisocyanate was added. The reaction mixture was stirred at 90° C. for 1.5 hours. To this mixture 1.32 g of 1-decanol was added. The reaction mixture was stirred at 90° C. for 1 hour. The mixture was cooled and poured onto a plastic tray to evaporate toluene. The polymer was further dried in a vacuum oven.

Example 1

To a 500 ml reaction kettle equipped with a nitrogen inlet, stirrer, Dean Stark trap and a condenser, 56.3 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.69 g of Desmodur N3600. The mixture was stirred for 2 minutes and 0.10 g of K-Kat 348 was added. The reaction is stirred at 90° C. for 3 hours. To this mixture, 1.68 g hexamethylene diisocyanate and 1.32 g of 1-decanol was added simultaneously. The reaction mixture was stirred at 90° C. for 1.0 hour. The mixture was cooled and poured onto a plastic tray to evaporate toluene. The polymer was further dried in a vacuum oven.

Thickener Example 2

To a 500 ml reaction kettle equipped with a nitrogen inlet, stirrer, Dean Stark trap and a condenser, 56.3 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.188 g of 1-decanol, 1.38 g hexamethylene diisocyanate, and 0.69 g of Desmodur N3600. The mixture was stirred for 2 minutes and 0.10 g of K-Kat 348 was added. The reaction is stirred at 90° C. for 3 hours. To this mixture 0.47 g of 1-decanol was added and stirred at 90° C. for 45 minutes. The mixture was cooled and poured onto a plastic tray to evaporate toluene. The polymer was further dried in a vacuum oven.

Thickener Example 3

To a 500 ml reaction kettle equipped with a nitrogen inlet, stirrer, Dean Stark trap and a condenser, 48.75 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.16 g of 1-decanol, 1.46 g hexamethylene diisocyanate, and 0.59 g of Desmodur N3600. The mixture was stirred for 2 minutes and 0.10 g of K-Kat 348 was added. The reaction is stirred at 90° C. for 3 hours. To this mixture 0.98 g of 1-decanol was added and stirred at 90° C. for 45 minutes. The mixture was cooled and poured onto a plastic tray to evaporate toluene. The polymer was further dried in a vacuum oven.

Thickener Example 4

To a 500 ml reaction kettle equipped with a nitrogen inlet, stirrer, Dean Stark trap and a condenser, 48.75 g of PEG 8000 and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 90° C. followed by addition of 0.33 g of 1-decanol, 1.46 g hexamethylene diisocyanate, and 0.59 g of Desmodur N3600. The mixture was stirred for 2 minutes and 0.1 g of K-Kat 348 was added. The reaction is stirred at 90° C. for 3 hours. To this mixture 0.82 g of 1-decanol was added and stirred at 90° C. for 45 minutes. The mixture was cooled and poured onto a plastic tray to evaporate toluene. The polymer was further dried in a vacuum oven.

Aqueous Composition Example 1

Preparation of aqueous solutions of thickeners was conducted using the examples set forth herein. Viscosity-regulating solutions based on the compositions prepared in Example 1-4 were prepared by combining 25% of the viscosity regulating composition; 10 wt. % of the viscosity suppressant, and 65 wt. % of water.

Aqueous Composition Example 2

Exemplary viscosity regulating solutions based on the compositions prepared in Examples 1-4 were prepared by combining 20-25% of the viscosity regulating composition and 75-80% water.

Experimental Examples for Paint Properties of Rheolgy Modifiers.

The following Examples illustrate the thickener of the present invention being incorporated into an acrylic latex based semi-gloss paint. The ingredients used in acrylic latex paint are shown in Table 1. A masterbatch, withholding the thickener of the invention and some water, was prepared in a lined 1 gallon can using a Dispermat CV high shear disperser equipped with a heavy duty impeller. This was decanted into lined pint cans (243 g). Each inventive thickener was added and rebulked with water to equal a 100 gallon formulation. A Dispermat CV equipped with a heavy duty impeller was used for mixing in inventive thickeners.

TABLE 1

| Optive 130 Semi Gloss Formulation | | | |
|---|---|---|---|
| Pounds | Gallons | Weight % | Raw Material |
| 100 | 12 | 9.48 | Water |
| 0.5 | 0.05 | 0.05 | Natrosol 330 Plus |
| 1 | 0.13 | 0.09 | Ammonium hydroxide |
| 10 | 1.08 | 0.95 | Ethylene Glycol |
| 5 | 0.54 | 0.47 | Tamol 731 |
| 2 | 0.27 | 0.19 | BYK 021 |
| 3 | 0.32 | 0.28 | Nuosept 95 |
| 225 | 6.75 | 21.33 | Ti02 (R706) |
| 30 | 1.38 | 2.84 | Minex 7 |
| 3 | 0.15 | 0.28 | Attagel 50 |
| Let-down | | | |
| 525 | 59.32 | 49.77 | Optive 130 |
| 90 | 10.8 | 8.53 | Water |
| 2 | 0.25 | 0.19 | Texanol |
| 3 | 0.36 | 0.28 | BYK 024 |
| 31.3 | 3.68 | 2.97 | ICI Builder |
| 24.30 | 2.92 | 2.3 | Water |
| 1055.1 | 100 | 100 | TOTAL |

* PVC = 22%, Volume Solids = 38%

TABLE 2

Comparison of Rheology Modifiers

| Example | Stormer (KU) | ICI (Poise) | Brookfield (cPs) | Sag | Level |
|---|---|---|---|---|---|
| Comparative Example 1 | 114 | 2.7 | 3356 | 14 | 8 |
| Comparative Example 2 | 113 | 3.4 | 3104 | 10 | 9 |
| Example 1 | 118 | 3.5 | 3538 | 16-18 | 8 |
| Example 2 | 121 | 3.1 | 4456 | 14 | 8 |
| Example 3 | 117 | 2.8 | 3984 | 16 | 8 |
| Example 4 | 115 | 2.7 | 3645 | 16 | 9 |

The Examples demonstrate that a change in process steps results in improved sag/flow profile compared to process used to make the Comparative Examples.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modifications will be apparent to those skilled in the art, and may be made without departing from the spirit or scope of the disclosure.

We claim:

1. A process for the preparation of a hydrophobically modified alkylene oxide urethane branched polymer, the process comprising:
   contacting a polyisocyanate compound with a water-soluble polyalkylene glycol, under a first reaction condition, to form a first reaction mixture, the polyisocyanate compound comprising at least three isocyanate groups, the first reaction mixture comprising a water-soluble polyalkylene glycol and a poly-hydroxyalkylene oxide urethane, wherein the water-soluble polyalkylene glycol is in a quantity of from 5-10 times a molar amount required to react with a molar amount of the polyisocyanate compound present in the first reaction mixture;
   contacting the first reaction mixture with a diisocyanate compound and one or more mono-functional compounds, having an isocyanate reactive functional moiety, under a second reaction condition, to form a second reaction mixture, the second reaction mixture comprising the hydrophobically modified alkylene oxide urethane branched polymer, wherein the mono-functional compound is in a quantity of from about 3 to about 9 times the molar amount of the polyisocyanate compound.

2. The process for the preparation of the hydrophobically modified alkylene oxide urethane branched polymer in accordance with claim 1, wherein the first reaction condition comprises contacting the polyisocyanate compound with the water-soluble polyalkylene glycol in the presence of a solvent.

3. The process for the preparation of the hydrophobically modified alkylene oxide urethane branched polymer in accordance with claim 2, wherein the solvent comprises toluene.

4. The process for the preparation of the hydrophobically modified alkylene oxide urethane branched polymer in accordance with claim 1, wherein the first reaction condition comprises contacting the polyisocyanate compound with the water-soluble polyalkylene glycol in the absence of a solvent.

5. The process for the preparation of the hydrophobically modified alkylene oxide urethane branched polymer in accordance with claim 1, wherein the diisocyanate compound is in a quantity of from about 4 to about 10 times the molar amount of the polyisocyanate compound.

6. The process for the preparation of the hydrophobically modified alkylene oxide urethane branched polymer in accordance with claim 1, wherein the diisocyanate compound and the mono-functional compound are added simultaneously to the first reaction mixture.

7. The process for the preparation of the hydrophobically modified alkylene oxide urethane branched polymer in accordance with claim 1, wherein the mono-functional compound is independently selected from the group consisting of a linear, branched, or alicylic aliphatic groups having an isocyanate reactive moiety.

8. The process for the preparation of the hydrophobically modified alkylene oxide urethane branched polymer in accordance with claim 7, wherein the linear or branched aliphatic alcohol are independently selected from the group consisting of: 2-ethylhexanol, 1-octanol, 1-decanol, 1-dodecanol, 1-tetradecanol, 1-hexadecanol, 2-butyloctanol, 2-hexyldecanol, di-n-octylaminoethanol, di-2-ethylhexylaminoethanol, di-hexylaminoethanol, 2-(diphenylphosphino)ethylamine, 2-(dioctylamino)-ethanol, and 2-(diethylhexylamino)-ethanol.

9. The process for the preparation of the hydrophobically modified alkylene oxide urethane branched polymer in accordance with claim 1, wherein the mono-functional compound is independently selected from the group consisting of: a primary amine, a secondary amine or a tertiary amine.

10. The process for the preparation of the hydrophobically modified alkylene oxide urethane branched polymer in accordance with claim 9, wherein the amines are independently selected from the group consisting of: nonylamine, hexylamine, heptylamine, octylamine, decylamine, dodecylamine, N-methyl-N-octadecylamine, N-octylethylenediamine, N-dodecylethylene-diamine, N-octylaminoethanol, N-dodecylaminoethanol, and 2-(2,2,6,6-tetramethyl-4-piperidinyl) ethanol.

11. The process for the preparation of the hydrophobically modified alkylene oxide urethane branched polymer in accordance with claim 1, wherein the hydrophobically modified alkylene oxide urethane branched polymer comprises an alkyl carbamate end-capped hydrophobically modified alkylene oxide urethane.

12. The process for the preparation of the hydrophobically modified alkylene oxide urethane branched polymer in accordance with claim 1, wherein the polyisocyanate compound is independently selected from the group consisting of HDI isocyanurate (trimer), IPDI isocyanurate (trimer), and a combination thereof.

13. The process for the preparation of the hydrophobically modified alkylene oxide urethane branched polymer in accordance with claim 1, wherein the polyisocyanate compound is independently selected from the group consisting of compounds represented by the following Formulas 1-3:

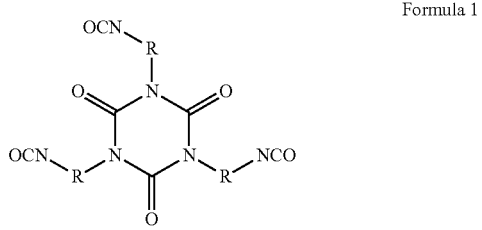

Formula 1

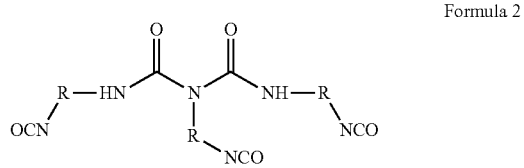

Formula 2

-continued

Formula 3

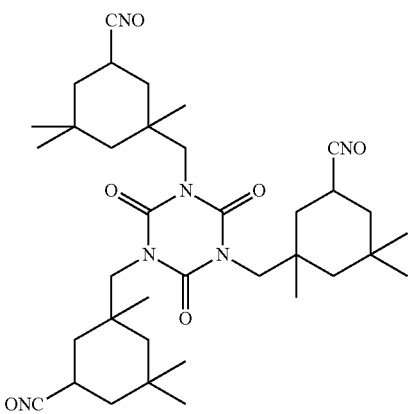

wherein R is a $C_4$-$C_{30}$-alkylene group, more particularly a $C_4$-$C_{20}$-alkylene group.

14. The process for the preparation of the hydrophobically modified alkylene oxide urethane branched polymer in accordance with claim 1, wherein the water-soluble polyalkylene glycol comprises PEG 8000 polyethylene glycol.

15. The process for the preparation of the hydrophobically modified alkylene oxide urethane branched polymer in accordance with claim 1, wherein the water-soluble polyalkylene glycol comprises a polyethylene glycol having a number average molecular weight in the range independently selected from the group consisting of from about 4000 to about 9000 g/mole, about 6000 to about 9000 g/moles, and from about 7000 to about 9000 g/mole.

* * * * *